(12) United States Patent
Khan (10) Patent No.: US 10,099,433 B2
(45) Date of Patent: Oct. 16, 2018

(54) DATUM FEATURE FOR A COMPOSITE COMPONENT

(71) Applicant: ROLLS-ROYCE plc, London (GB)

(72) Inventor: Bijoysri Khan, Derby (GB)

(73) Assignee: ROLLS-ROYCE plc, London (GB)

( * ) Notice: Subject to any disclaimer, the term of this patent is extended or adjusted under 35 U.S.C. 154(b) by 16 days.

(21) Appl. No.: 15/227,267

(22) Filed: Aug. 3, 2016

(65) Prior Publication Data

US 2017/0043541 A1 Feb. 16, 2017

(30) Foreign Application Priority Data

Aug. 11, 2015 (GB) .................................. 1514139.3

(51) Int. Cl.
*B29C 70/34* (2006.01)
*B29C 70/54* (2006.01)
*B29C 65/00* (2006.01)
*B29C 70/86* (2006.01)
*B29K 105/08* (2006.01)
(Continued)

(52) U.S. Cl.
CPC ............ *B29C 70/345* (2013.01); *B29C 66/51* (2013.01); *B29C 70/34* (2013.01); *B29C 70/342* (2013.01); *B29C 70/545* (2013.01); *B29C 70/86* (2013.01); *B29K 2105/0872* (2013.01); *B29K 2307/04* (2013.01); *B29K 2309/08* (2013.01); *B29L 2031/082* (2013.01); *C09J 2205/302* (2013.01); *Y10T 428/24174* (2015.01); *Y10T 428/24182* (2015.01)

(58) Field of Classification Search
CPC ............ Y10T 428/24174; B29C 70/86; B29C 70/865; B29C 65/564; B29C 70/342; B29C 70/345; B29K 2105/0872

USPC ......................................................... 428/119
See application file for complete search history.

(56) References Cited

U.S. PATENT DOCUMENTS 4,084,922 A 4/1978 Glenn
5,609,953 A 3/1997 Tamura
(Continued)

FOREIGN PATENT DOCUMENTS

EP 1077308 A1 2/2001
EP 2363271 A1 9/2011
(Continued)

OTHER PUBLICATIONS

Dec. 18, 2015 Search Report issued in British Patent Application No. 1514139.3.
(Continued)

*Primary Examiner* — Alexander S Thomas
(74) *Attorney, Agent, or Firm* — Oliff PLC (57) ABSTRACT

A composite component includes a component body and a datum feature. The datum feature projects in a first direction from a surface of the component body; the component further includes a plurality of pins extending generally in the first direction so that a first end of each pin is engaged in the component body and a second end of each pin is engaged in the datum feature. The datum feature is removable from the component so as to leave the first ends of the pins engaged with the component body. The first ends of the pins may be used to identify and locate the position of the original datum feature, when the component requires repair or other attention.

8 Claims, 12 Drawing Sheets

(51) Int. Cl.
   *B29K 309/08* (2006.01)
   *B29K 307/04* (2006.01)
   *B29L 31/08* (2006.01)

(56) References Cited

U.S. PATENT DOCUMENTS

| | | | |
|---|---|---|---|
| 6,436,507 B1 * | 8/2002 | Pannell | B29C 65/344 428/102 |
| 2005/0064134 A1 | 3/2005 | Brantley et al. | |
| 2010/0167039 A1 * | 7/2010 | Choi | B29C 66/001 428/223 |
| 2012/0291585 A1 | 11/2012 | Minamigata et al. | |
| 2014/0234098 A1 | 8/2014 | Anderson et al. | |

FOREIGN PATENT DOCUMENTS

| | | |
|---|---|---|
| EP | 2 642 076 A2 | 9/2013 |
| FR | 2 312 673 A1 | 12/1976 |
| FR | 2 697 284 A1 | 4/1994 |

OTHER PUBLICATIONS

Feb. 3, 2017 Search Report issued in European Patent Application No. 16 18 2539.

\* cited by examiner

DATUM FEATURE FOR A COMPOSITE COMPONENT

This disclosure relates to the manufacture of composite components, and in particular to the provision of datum features on such components.

It is known to provide reference or datum features on components during their manufacture, so that manufacturing operations can be carried out relative to a known and stable position or so that the component can be secured in a jig or fixture in a known relationship to a machine tool. Once all the manufacturing operations are completed, the datum feature is typically machined away if it does not form an integral part of the completed component.

Figure 1:
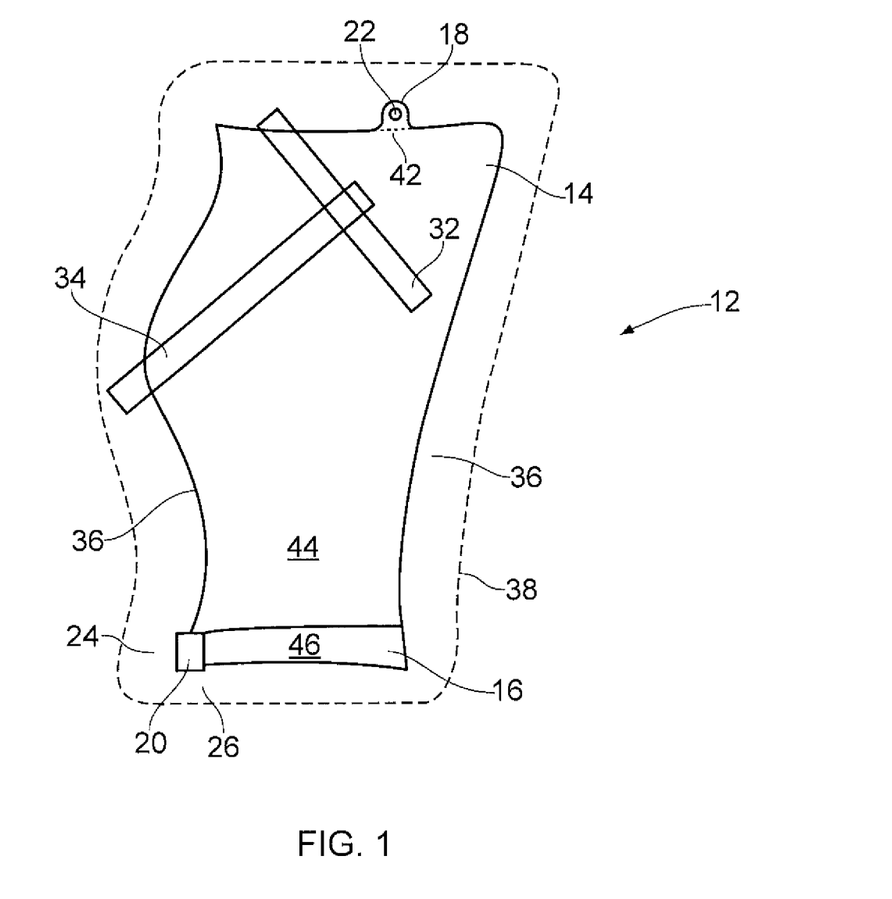
FIG. 1 is a schematic view illustrating a known manufacturing method for a composite component, as already described.

A known arrangement for providing datum features on a composite component is illustrated in FIG. 1.

The component, which in this arrangement is a fan blade 12 for a gas turbine engine, has (in its final form) an aerofoil portion 14 and a root portion 16. It also has datum features 18 and 20. Datum feature 18 has a hole 22 drilled through it, and datum feature 20 has mutually perpendicular faces 24, 26; these features can be used to establish the position of the blade with respect to an absolute reference point for subsequent operations.

The component 12 is manufactured by a known method, such as tape laying in which tapes of reinforcing fibres pre-impregnated with partially-cured resin ("pre-preg") are laid within a mould to build up the component. Typically, successive layers of tapes are laid at different angles to provide the desired material properties in the final component. Two example tapes 32, 34 are shown in FIG. 1; similar tapes are laid across the whole extent of the blade 12. Once the tape laying is complete, optionally an initial trim is made, and the mould is closed and the composite material is consolidated and cured in the conventional manner.

To facilitate the inclusion of the datum features 18, 20 in the finished blade 12 the tapes are laid beyond the edges 36 of the finished blade 12, and extend as far as the dashed line 38, forming an "overlay region". Once the composite material has been cured, the final shape of the blade 12 (including the 'external' datum features 18, 20) is cut out using a known technique such as waterjet cutting.

A disadvantage of this method of manufacture is that the material in the overlay region is wasted. As well as the wasted cost of this material, additional time is needed during manufacturing because the pre-preg tapes must be laid across a wider area.

A further disadvantage of this method is that the additional step of drilling a hole 22 through the datum feature 18 may reduce confidence in the datum position (because the limitations of the drilling process may make the hole misaligned or inaccurately positioned).

After the subsequent machining operations in the manufacturing process have been performed, the datum features are typically machined away (for example, for the datum feature 18, along the dotted line 42) to leave only the final shape of the blade 12. This gives rise to a further disadvantage of this method of manufacture, because the positions of the datum features are now irrevocably lost.

This means that in any subsequent operations performed on the blade 12 (for example, in-service inspections or repairs) there are no longer any datum features by which the blade can be located, or by reference to which operations can be carried out relative to the "as manufactured" datum. Features such as the aerofoil surface 44 or the root 46 must therefore be used as datum features, which is unsatisfactory because these regions of the blade are subject to unpredictable wear in use. Therefore, confidence in the datum position is reduced and inspection or repair operations must be carried out in a more conservative manner, with greater allowances for errors, to ensure safe margins for future operations. This may lead to unnecessary repairs or to shortened component lives.

It would be desirable to have a method for providing datum features on a component that reduces or overcomes these disadvantages.

According to a first aspect there is provided a composite component as set out in the claims. According to a second aspect there is provided a method of making a composite component as set out in the claims.

Embodiments of the invention will now be described in more detail, with reference to the attached drawings, in which

FIG. 9(b) is a partial plan view on the arrow B of FIG. 9(a)

In the drawings, like elements are identified by like reference numbers.

Figure 2:
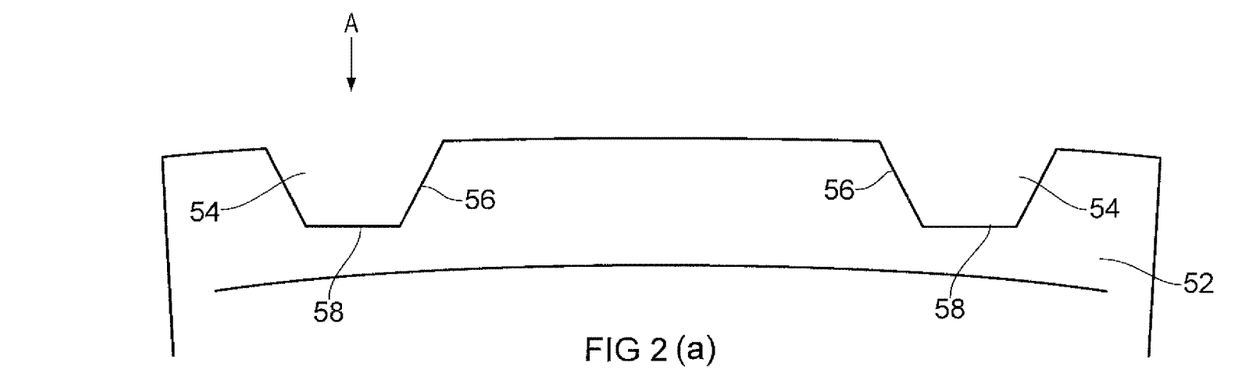
FIGS. 2 to 9 show successive steps in a first method of manufacturing a composite component including datum features. In each of FIGS. 2 to 5, (a) is a sectional side view and (b) is a partial plan view on the arrow A of (a).
Figure 2B:
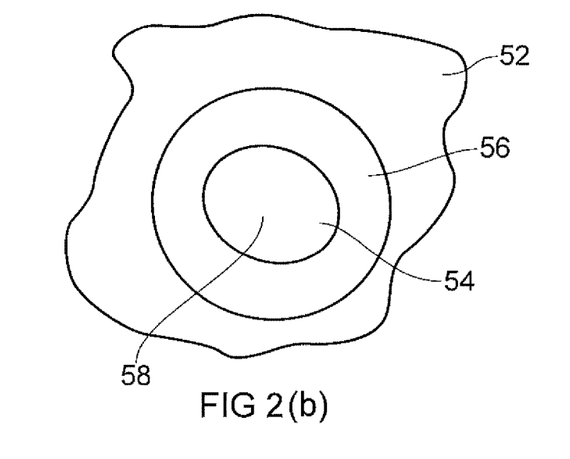

FIGS. 2(a) and 2(b) show a lower part 52 of a mould for manufacturing a composite component. The upper part of the mould is not shown. The mould part 52 comprises two recesses 54; the recesses are in the shape of truncated cones, with angled walls 56 and flat bottoms 58. The mould is of known type, and is made of a material with a thermal coefficient of expansion compatible with the composite material to be used (for example, made from Invar® or carbon composite).

Figure 3:
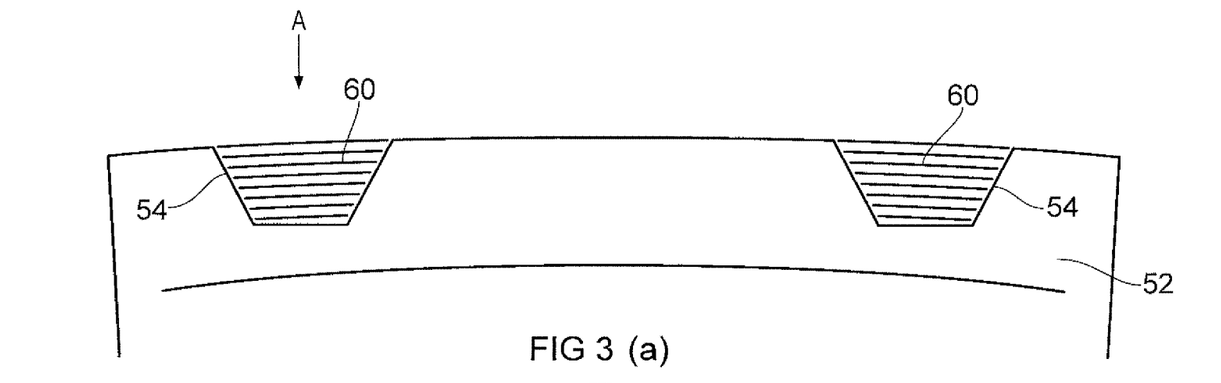
Figure 3B:
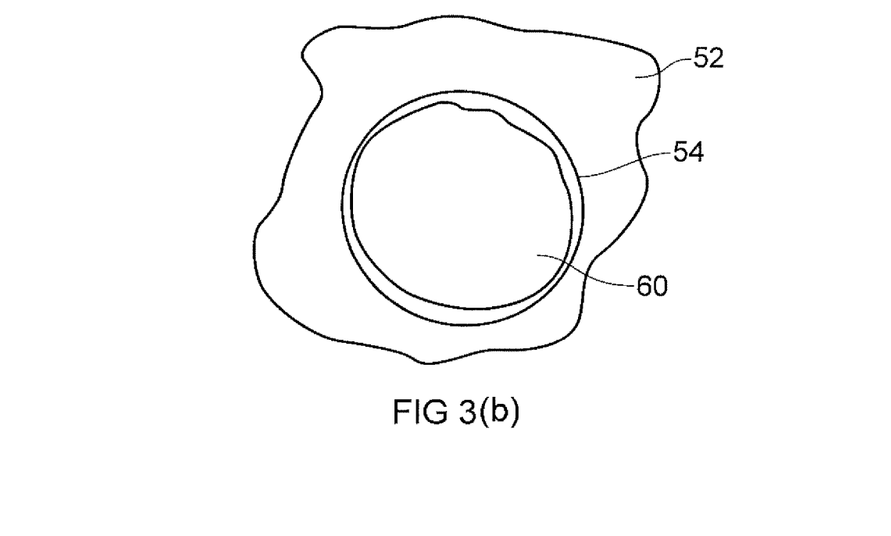

FIGS. 3(a) and 3(b) show the mould part 52 following a step of a first manufacturing method. Layers 60 of pre-preg have been laid in each recess 54 so as to fill it. After consolidation and curing these layers will form the datum features of the component, as will be further explained below.

Figure 4A:
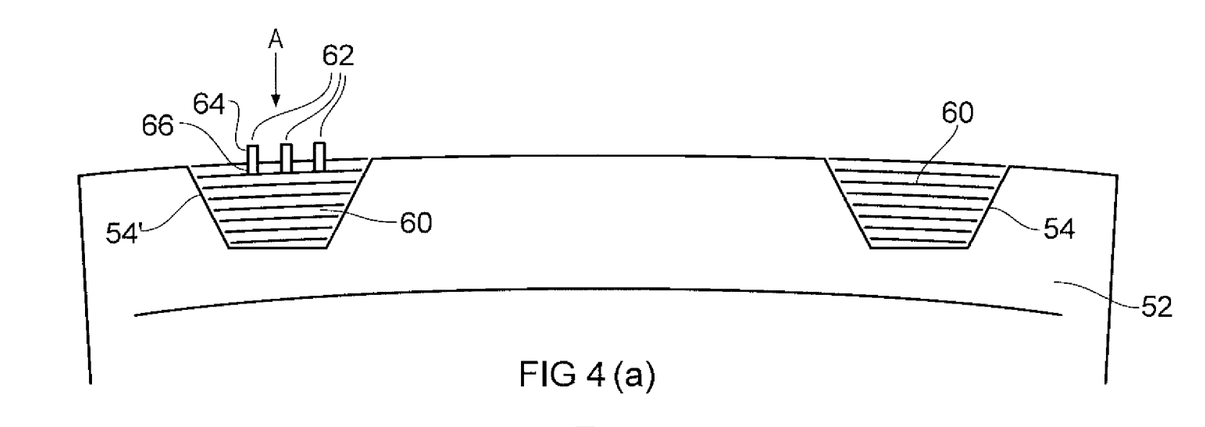
Figure 4B:
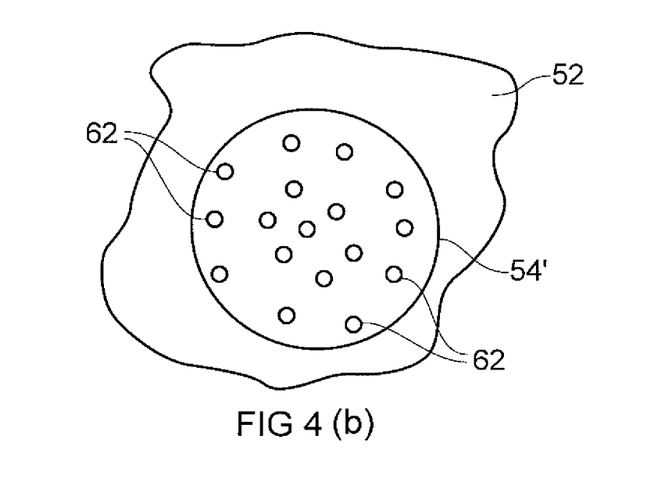

FIG. 4(a) shows the mould part 52 following a further step of the manufacturing method. In the recess 54', a plurality of pins 62 have been inserted into the pre-preg layers 60, so that a first end 64 of each pin protrudes above the surface of the layers 60 and a second end 66 of each pin is embedded and engaged in the pre-preg layers. As can be seen in FIG. 4(b), the pins 62 are distributed around the recess 54'. The pins are similar to known pins used for z-pinning (through-thickness reinforcement) of composite structures, and are made, for example, from glass or carbon fibres. It is known to use monolithic pins or pins formed from bundles of fibres; it is also known to use pultruded carbon rods. The diameter of the pins is typically between 0.2 mm and 1.0 mm. The volume ratio of the pins is typically between 0.5% and 4.0%. The number of pins inserted into each recess will depend upon a number of factors, including the size and weight of the component and the number of datum positions (i.e. the complexity of the structure being formed).

In a further step of the manufacturing method, further pins 62 would be inserted, in a similar manner, into the pre-preg layers 60 in recess 54". (For simplicity, this disclosure and drawings will describe the steps of the method only with reference to recess 54', but a skilled person will understand that all the steps performed on that recess would in reality also be performed on recess 54".)

Figure 5:
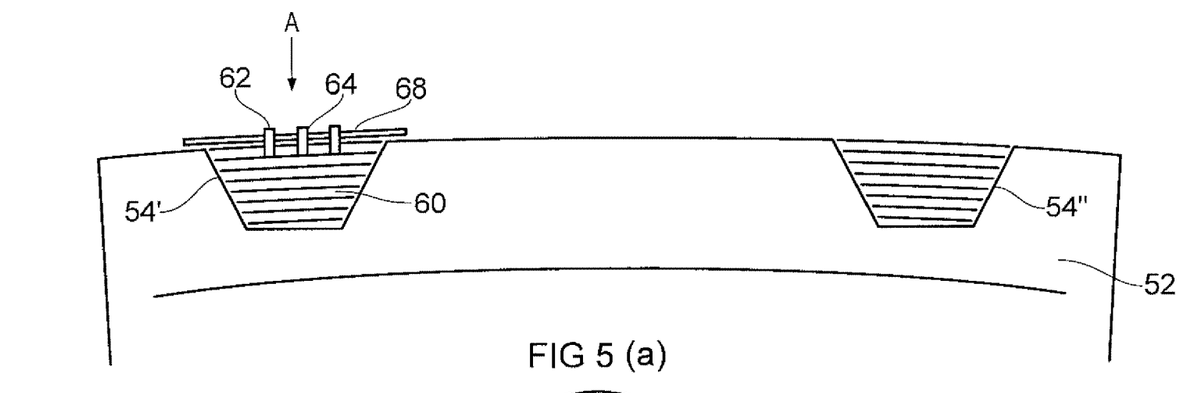

FIG. 5(*a*) shows the mould part 52 following a further step of the manufacturing method. A release layer 68 has been laid on the pre-preg layers 60, so as to overlie the recess 54'. It can be seen from FIG. 5(*b*) that the edge of the release layer 68 extends beyond the edge (shown as a dashed line) of the recess 54'. The release layer is perforated so that the first ends 64 of the pins 62 protrude through the release layer 68. The release layer is made from a conventional material such as PTFE, PVF or ETFE film (for instance DuPont™ Tedlar® film) that will not adhere to the composite material during the curing process, but provides sufficient stiction to remain in place.

Figure 6:
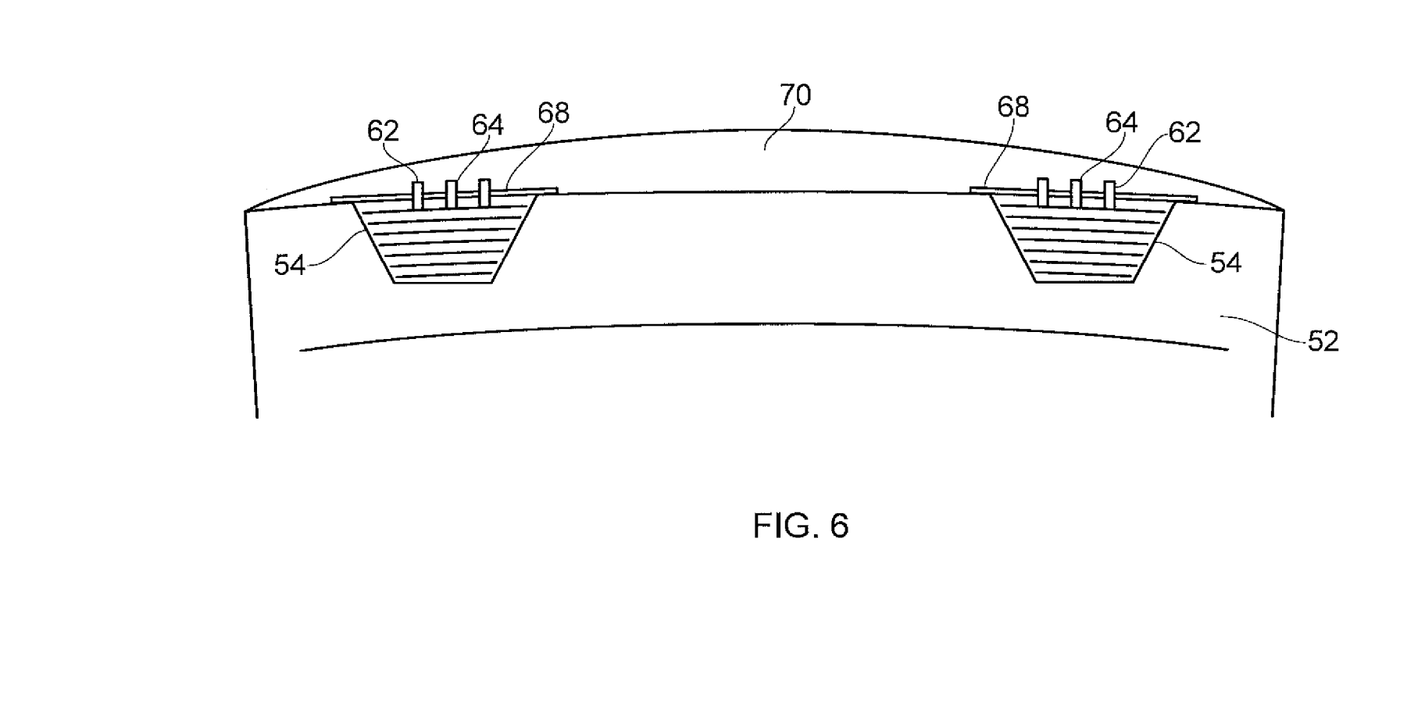

FIG. 6 shows the mould part 52 following a further step of the manufacturing method. In previous steps, as described above, pins 62 have been inserted into the pre-preg layers 60 and release layers have been applied over the recesses 54. In this step, tapes or layers of pre-preg 70 are laid in and on the mould part 52 to form the shape of the composite component. Typically, these tapes or layers will be applied in a conventional manner in different directions, in for instance a quasi-isotropic laminate structure (using rules such as diamond rule, as specified in US MIL handbook 17 and other similar treatises) in a similar manner to that shown in FIG. 1. As the tapes or layers are built up, the first ends 64 of the pins 62 will become embedded and engaged in the pre-preg 70.

Because there is no need to provide external datum features, the overlay region of the component need not be as large as in the known arrangement shown in FIG. 1, so less material is wasted in the manufacture of the component.

Once the laying and consolidation of the pre-preg 70 is complete, either the component is vacuum bagged (not shown), or the upper part of the mould (not shown in the drawings) is brought into place and the mould closed. The pre-preg is then cured in a conventional manner, typically in an autoclave, to form the component. During the curing process, the first ends 64 and second ends 66 of the pins 62 will become securely fixed, respectively within the pre-preg 70 forming the component and within the pre-preg 60 forming the datum features.

Figure 7:
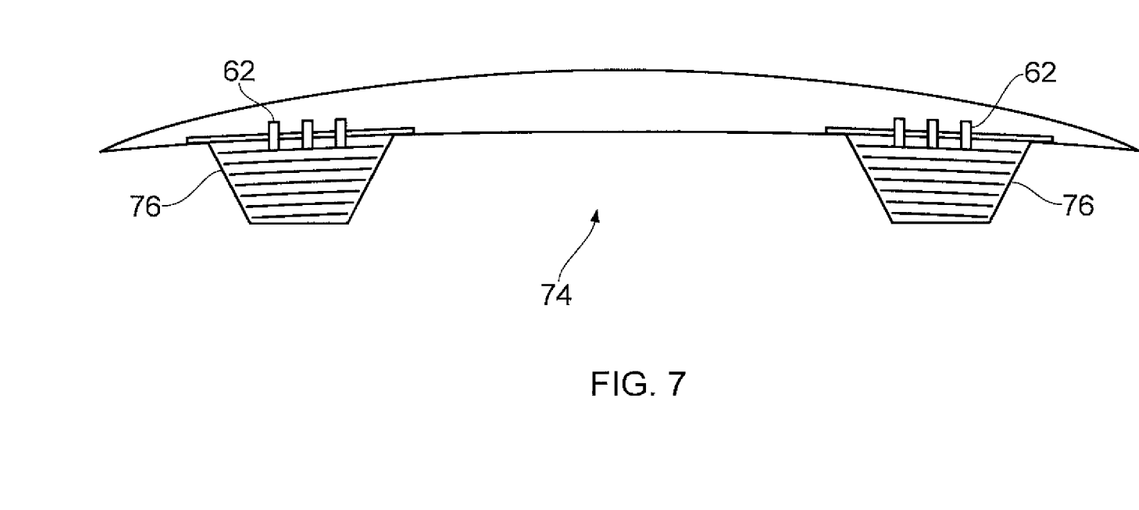

FIG. 7 shows the composite component 74 following curing and removal from the mould. Datum features 76 protrude from the surface of the component, and (as in known arrangements) may be used to establish the position of the blade with respect to an absolute reference point for subsequent machining or finishing operations.

Figure 8:
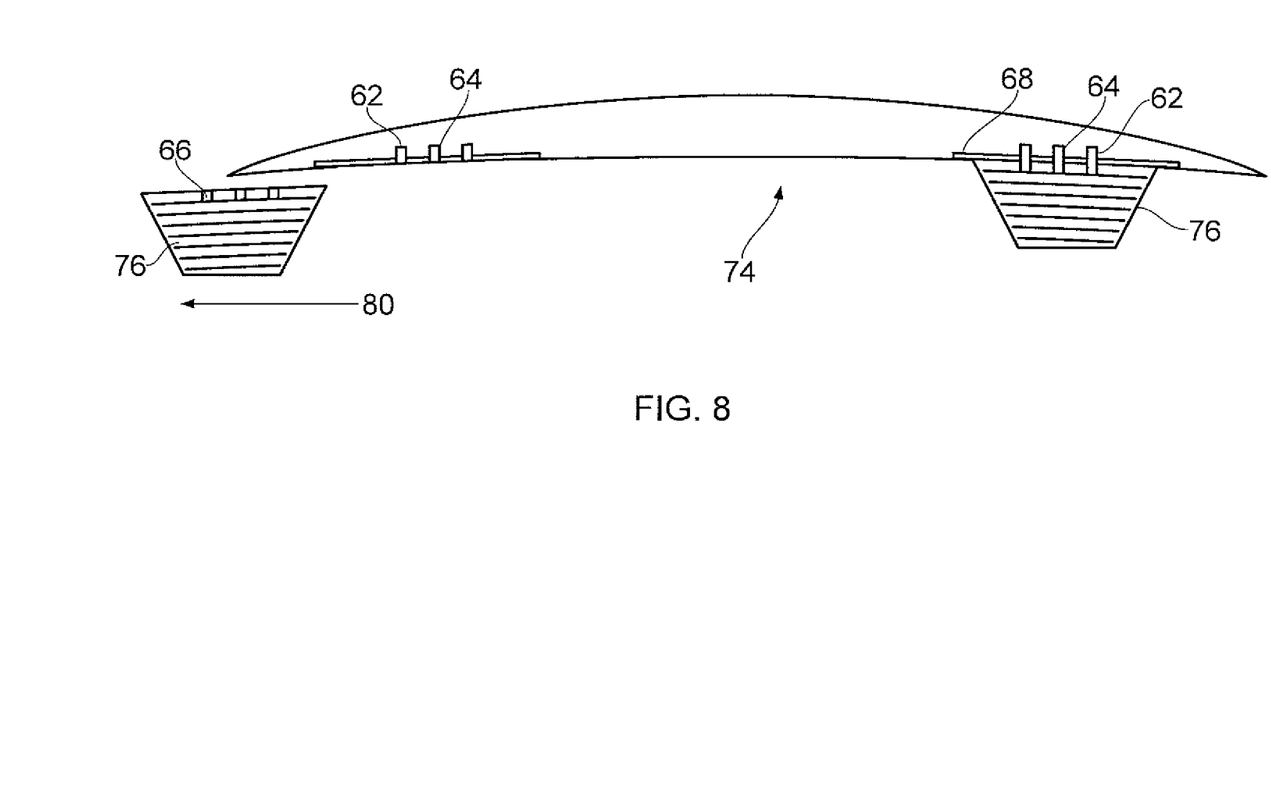

Once all the manufacturing operations have been completed, the datum features 76 must be removed to make the composite component 74 ready for use. As shown in FIG. 8, the presence of the release layers 68 permits the datum feature 76' to be removed by applying a force in the direction shown by the arrow 80, so as to shear the pins 62. The first ends 64 of the pins remain in the composite component 74, and the second ends 66 of the pins 62 remain within the datum feature 76'.

The datum feature 76' can now be recycled or disposed of. As the datum feature 76' was formed and cured with the component it can be used as a process control or to manufacture test pieces for destructive testing. Additional parts made together with the original for NDE or for test purposes are in the trade called "carriers"; this saves having to take production parts for destructive (cut-up) testing to validate the production process, thus reducing the need to periodically destructively test completed components to assure process compliance, such as correct curing.

Figure 9A:
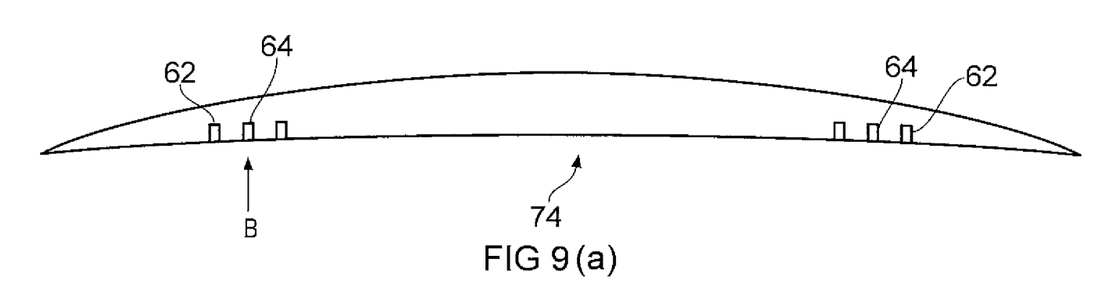
Figure 9B:
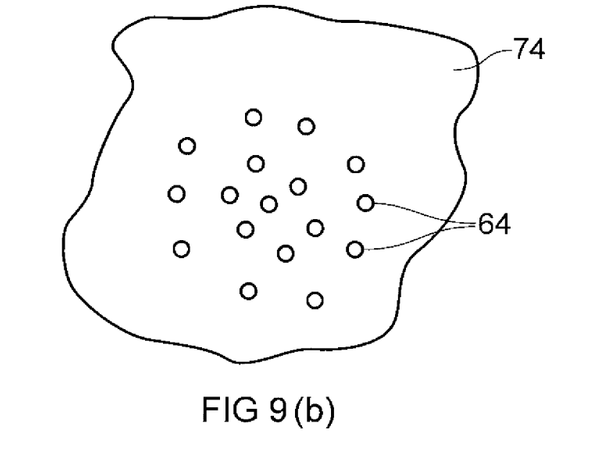

FIG. 9(*a*) shows a completed composite component 74, following the removal of the datum features. The first ends 64 of the pins 62 remain in the composite component 74, and, as shown in FIG. 9(*b*), are visible at the surface of the composite component 74.

The composite component can then move on for finishing and protection to be applied. Typically this requires a UV protection layer, moisture barrier, colourant/paint, and impact/erosion protection layer. Depending upon the product, all these features may be provided by a single material layer.

When subsequent operations (for example, inspection or repair operations) are to be performed on the composite component following a period in service, the pin positions can be detected and used to determine the precise positions of the original datum features. The position of the blade can therefore be determined with respect to the same reference points used during its manufacture, and the subsequent operations can be performed relative to the original datum positions. This gives greater confidence and accuracy in the operations.

Before a repair operation can commence, normally the protective layer is removed; this allows access to the pinned area for detection, either: visibly; by CT scan; or by surface probe. Repairs or measurements can then be made relative to the original manufacturing datum. Knowing the position of the datum gives a reference to measure how much wear or distortion has taken place and where it has occurred.

Figure 10:
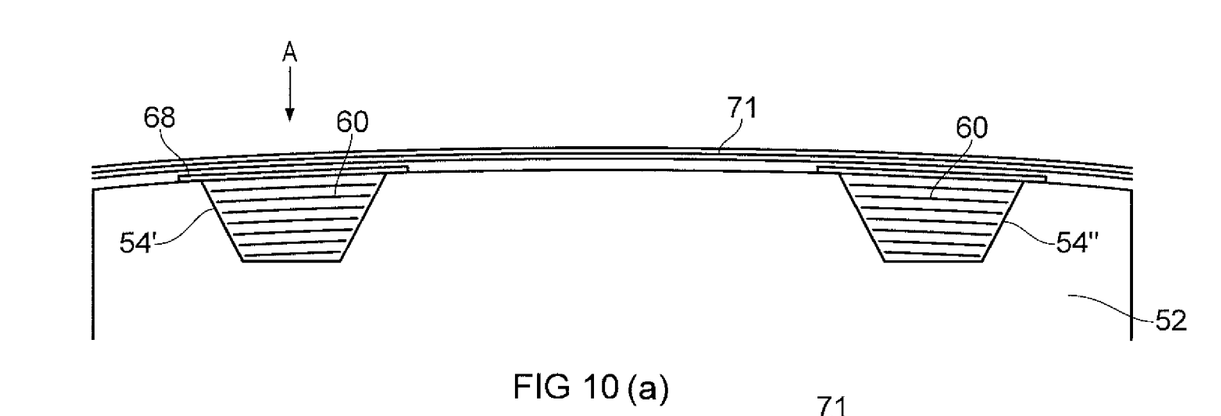
FIGS. 10 to 12 show successive steps in a second method of manufacturing a composite component including datum features. In each of FIGS. 10 and 11, (a) is a sectional side view and (b) is a partial plan view on the arrow A of (a).
Figure 11:
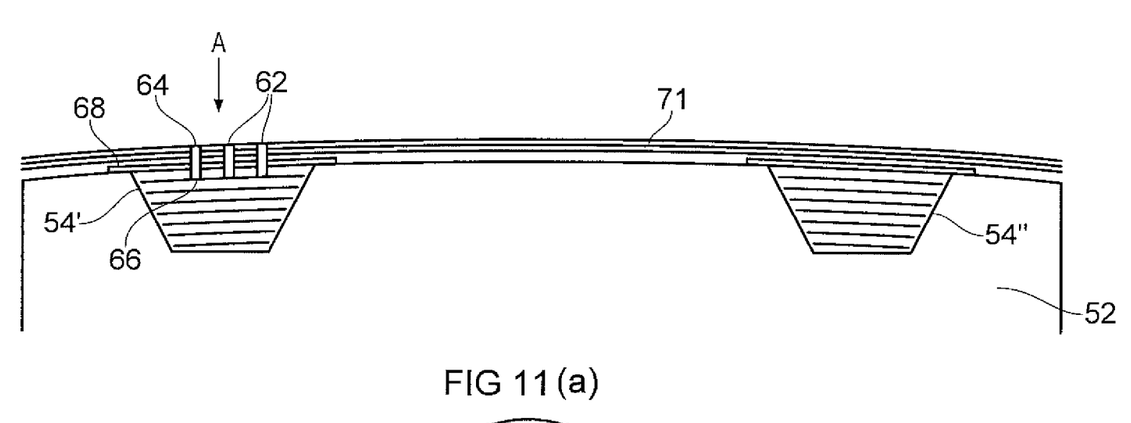
Figure 12:
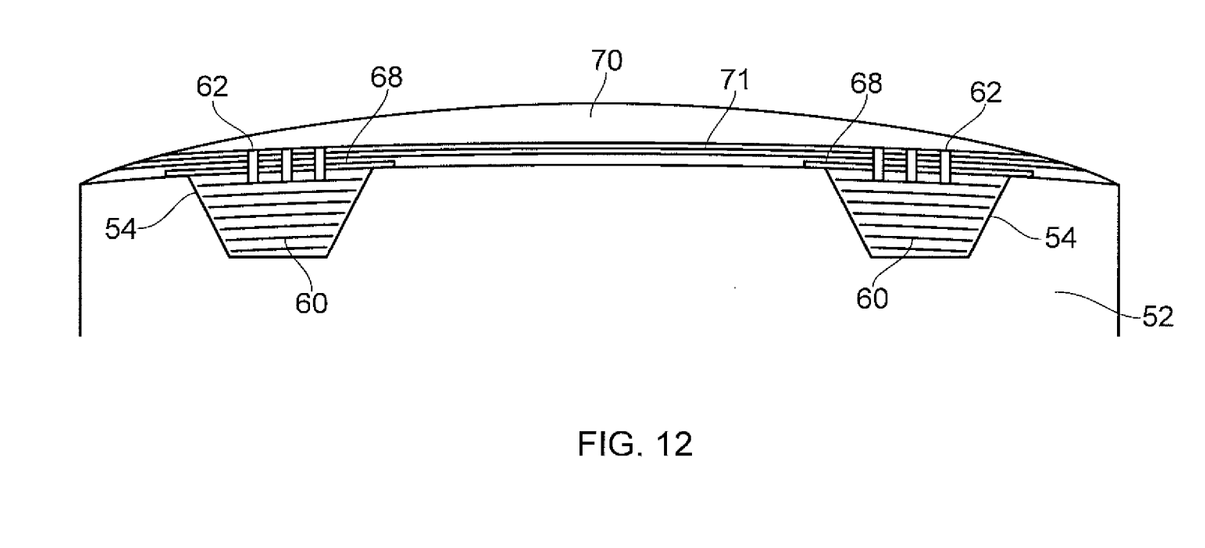

In a second manufacturing method, illustrated in FIGS. 10 to 12, a different sequence of steps is used to manufacture the composite component 74.

The first steps of the second manufacturing method are the same as those shown in FIGS. 2 and 3, and already described.

FIG. 10(*a*) shows the mould part 52 following a further step of the second manufacturing method. A release layer 68 has been laid on the pre-preg layers 60, so as to overlie the recess 54'. It can be seen from FIG. 10(*b*) that the edge of the release layer 68 (shown as a dashed line) extends beyond the edge of the recess 54'. The first few pre-preg layers 71 of the component have also been laid. These layers are the first that define the component and also serve to keep the release layer 68 in place.

FIG. 11(*a*) shows the mould part 52 following a further step of the second manufacturing method. In the recess 54', a plurality of pins 62 have been inserted into the pre-preg layers 60 through the first layers 71 of the component and the release layer 68, so that a first end 64 of each pin is embedded and engaged in the first layers 71 and a second end 66 of each pin is embedded and engaged in the pre-preg layers 60 in the recess 54'. As can be seen in FIG. 11(*b*), the pins 62 are distributed around the recess 54. The pins are of the same type and material as those already described in connection with FIG. 4.

FIG. 12 shows the mould part 52 following a further step of the second manufacturing method. In this step, further tapes or layers of pre-preg 70 are laid in and on the mould part 52 over the initial layers 71 (which will now become incorporated into the component pre-preg layers 70) to form the shape of the composite component. Typically, these tapes or layers will be applied in a conventional manner in different directions, as described above in connection with FIG. 6.

Once the laying and consolidation of the pre-preg 70 is complete, either the component is vacuum bagged (not shown), or the upper part of the mould (not shown in the drawings) is brought into place and the mould closed. The pre-preg is then cured in a conventional manner, typically in an autoclave, to form the component. During the curing process, the first ends 64 and second ends 66 of the pins 62 will become securely fixed, respectively within the pre-preg 70 forming the component and within the pre-preg 60 forming the datum features.

The remaining steps in the second manufacturing method are identical to the corresponding steps in the first manufacturing method, as shown in FIGS. 7 to 9 and already described.

An advantage of this second manufacturing method is that the release layer need not be perforated, because the action of inserting the pins will make holes through it, whilst the first few layers of the composite hold it in place. A composite consolidation step may take place prior to the insertion of the pins.

The pins are used to identify and locate the positions of the original datum features, when a component requires repair or other attention.

The invention claimed is:

1. A method of making a composite component including a datum feature, the method comprising the steps of:
    providing a mould for forming a composite component, the mould having a recess for forming a datum feature;
    filling the recess with pre-preg material;
    inserting a plurality of pins into the pre-preg material so that a first end of each pin protrudes from the pre-preg material and a second end of each pin is engaged in the pre-preg material;
    applying a release layer to the pre-preg material so that the first ends of the pins protrude through the release layer;
    applying at least one further pre-preg layer to form the composite component;
    performing a moulding operation to form the component in the mould, so that the first ends of the pins become engaged with the component; and
    curing the component.

2. A method of making a composite component including a datum feature, the method comprising the steps of:
    providing a mould for forming a composite component, the mould having a recess for forming a datum feature;
    filling the recess with pre-preg material;
    applying a release layer to the pre-preg material;
    applying at least one pre-preg layer above the release layer;
    inserting a plurality of pins through the pre-preg layer and release layer and into the pre-preg material so that a first end of each pin protrudes from the pre-preg layer and a second end of each pin is engaged in the pre-preg material;
    applying at least one further pre-preg layer to form the composite component;
    performing a moulding operation to form the component in the mould, so that the first ends of the pins become engaged with the component; and
    curing the component.

3. A composite component including a component body and a datum feature, the datum feature projecting in a first direction from a surface of the component body, the component further including a plurality of pins extending generally in the first direction so that a first end of each pin is engaged in the component body and a second end of each pin is engaged in the datum feature, the datum feature being removable from the component so as to leave the first ends of the pins engaged with the component body,
    wherein the composite component further includes a release layer provided between the component body and the datum feature to form a release plane.

4. The component of claim 3, wherein the first end of each pin is spaced from a surface of the component body that faces away from the datum feature, and the second end of each pin is spaced from a surface of the datum feature that faces away from the component body.

5. The component of claim 3, wherein the datum feature is in the form of a truncated cone or truncated pyramid.

6. The component of claim 3, wherein the datum feature is removable by shearing or fracturing the pins along the release plane.

7. The component of claim 3, wherein after the removal of the datum feature the positions of the first ends of the pins may be used to determine the position in which the datum feature was located.

8. A method of making a composite component including a datum feature, the method comprising the steps of:
    providing a mould for forming a composite component, the mould having a recess for forming a datum feature;
    filling the recess with pre-preg material;
    inserting a plurality of pins into the pre-preg material so that a first end of each pin protrudes from the pre-preg material and a second end of each pin is engaged in the pre-preg material;
    applying at least one further pre-preg layer to form the composite component;
    performing a moulding operation to form the component in the mould, so that the first ends of the pins become engaged with the component;
    curing the component; and
    removing the datum feature by applying a force to shear the pins such that the first ends of the pins remain in the composite component and the second ends of the pins remain in the datum feature.

* * * * *